United States Patent [19]

Waterworth et al.

[11] 4,215,755
[45] Aug. 5, 1980

[54] POWER TRANSMISSION MECHANISMS

[75] Inventors: Norman Waterworth; Eric A. Whateley, both of Huddersfield; Gerald A. Shipley, Worplesdon; John McKnight, Woking, all of England

[73] Assignee: David Brown Gear Industries Limited, Huddersfield, England

[21] Appl. No.: 953,791

[22] Filed: Oct. 23, 1978

[30] Foreign Application Priority Data

Oct. 25, 1977 [GB] United Kingdom ............... 44272/77

[51] Int. Cl.² ............................................. B62D 11/10
[52] U.S. Cl. .................................. 180/6.44; 74/720.5
[58] Field of Search ............................... 180/6.44, 6.7; 74/720.5

[56] References Cited

U.S. PATENT DOCUMENTS

| | | | |
|---|---|---|---|
| 3,250,151 | 5/1966 | Binger | 180/6.44 |
| 3,492,891 | 2/1970 | Livezey | 74/720.5 |
| 3,938,604 | 2/1976 | Kugler | 180/6.44 |

Primary Examiner—John J. Love
Assistant Examiner—Randall A. Schrecengost
Attorney, Agent, or Firm—Norris & Bateman

[57] ABSTRACT

A variable-ratio power transmission mechanism having two output shafts for driving respective wheels or tracks at opposite sides of a heavy off-the-road vehicle, and having a steering mechanism for varying the relative rotational speeds of said shafts, is known. Where the steering mechanism includes a null shaft which is not driven when straight-line travel is required, said shaft has been driveable by hydrostatic means, but these have sometimes proved unreliable. It is therefore proposed to drive the null shaft by mechanical two-speed gearing driven from the input of the power transmission mechanism. The null shaft is selectively driveable by said gearing in either direction of rotation through the appropriate one of two progressively engaging clutches until it attains a first speed, and an epicyclic reduction gear in said gearing is then locked up to drive the null shaft in the same direction at a higher speed.

8 Claims, 1 Drawing Figure

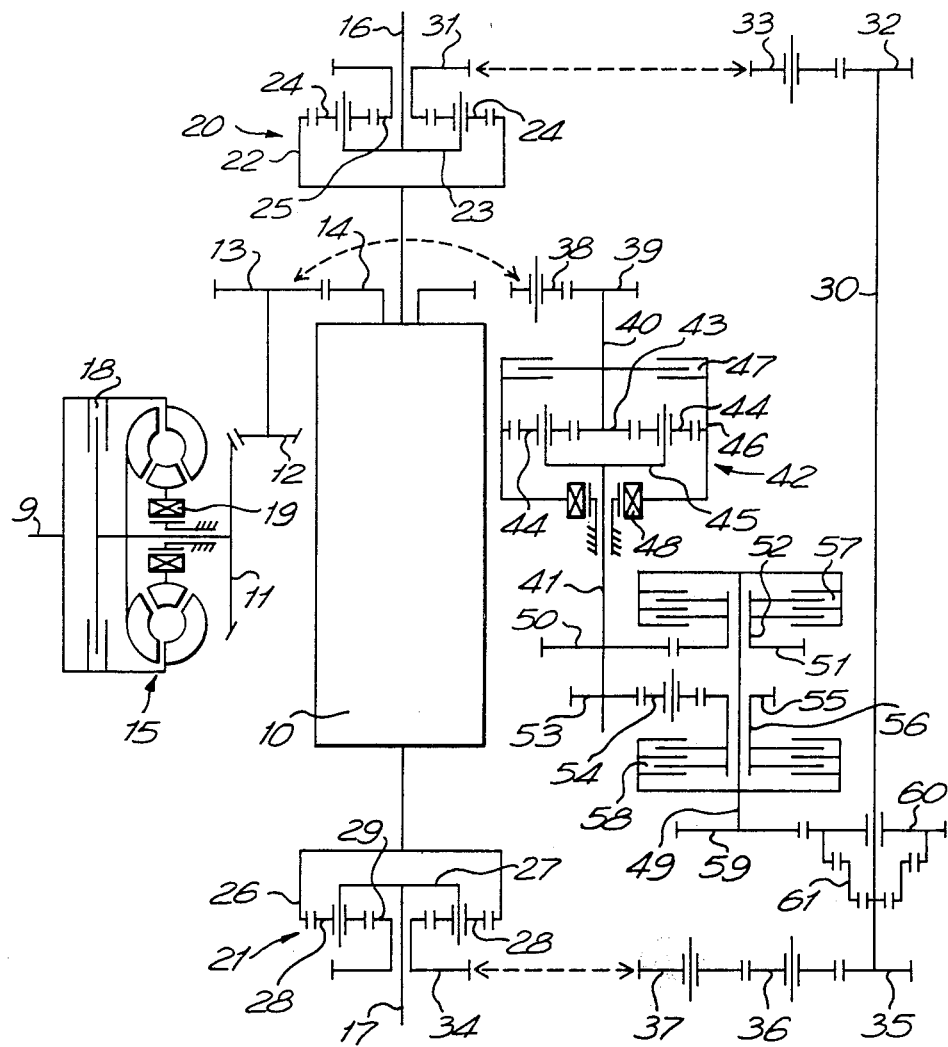

POWER TRANSMISSION MECHANISMS

BACKGROUND OF INVENTION

The invention relates to power transmission mechanisms, and more particularly to a steering mechanism for power transmission mechanisms of the type having two output shafts adapted to be connected to respective propulsion means disposed at opposite sides of a vehicle.

Throughout this specification, the expression "propulsion means" is intended to include wheels or tracks, and the expression "fixed to" is intended to mean "integral with or rigidly secured on".

It is known to steer a vehicle having a power transmission mechanism of the type referred to by varying the relative rotational speeds of the output shafts by an amount which is independent of the gear ratio being transmitted by the power transmission mechanism. This gives a larger turning circle in the higher gear ratios, which is in accord with the requirements of the vehicle for stable steering conditions.

In one known arrangement for effecting this, the output shafts are driven by respective epicyclic gears. The variable-ratio input member of each epicyclic gear is an annular gear, the output member is a planet carrier, and there is a negative auxiliary drive to a sun gear from one of two half-shafts which are driven by a differential gear from the input side of the power transmission mechanism. Each sun gear can be brought to rest by applying an associated brake, so that when either one of the sun gears and its associated half-shaft are braked the differential gear operates to double the rotational speed of the other half-shaft and its associated sun gear. This causes the relative rotational speeds of the planet carriers and the associated output shafts to vary, and thus effects steering of the vehicle. When both brakes are in the released condition, both half-shafts, both sun gears and thus both output shafts rotate at the same speed, so that the vehicle moves straight ahead.

In another known arrangement for varying the relative rotational speeds of the output shafts, said shafts are driven by respective epicyclic gears as described in the preceding paragraph, but there are no brakes associated with the sun gears, and the differential gear and half-shafts are replaced by a single shaft driveably connected to both sun gears by odd and even numbers of gears respectively. This applies equal and opposite reaction forces to the sun gears, and assuming that the drive resistance is the same at each wheel or track the vehicle moves straight ahead when there is no rotation of the sun gears and the shaft driveably connected thereto. For this reason said shaft has become known as a "null" shaft. Said shaft is driveable in either direction by hydrostatic means comprising a fixed capacity hydraulic motor supplied with oil under pressure by a variable and reversible delivery hydraulic pump driven from the input side of the power transmission mechanism. Rotation of the null shaft by the hydrostatic means causes the sun gears to rotate in opposite directions, as a result of which the relative rotational speeds of the planet carriers and the associated output shafts vary to effect steering of the vehicle. However, it has been found in practice that the hydrostatic means do not always function reliably.

The object of the present invention is to provide a novel arrangement for varying the relative rotational speeds of the output shafts which utilises a null shaft but does not employ associated hydrostatic means.

SUMMARY OF INVENTION

According to the invention, in a power transmission mechanism of the type having two output shafts adapted to be connected to respective propulsion means disposed at opposite sides of a vehicle, a steering mechanism for simultaneously causing the rotational speed of either one of said shafts to increase and that of the other of said shafts to decrease comprises a null shaft driveable in either direction of rotation to effect steering by varying the relative rotational speeds of the output shafts as aforesaid, and a mechanical two-speed drive taken from the input side of the power transmission mechanism for rotating the null shaft at a first speed, and then at a higher speed, in either direction.

BRIEF DESCRIPTION OF DRAWINGS

A preferred embodiment of the invention will now be described, by way of example, with reference to the accompanying diagrammatic drawing of a power transmission mechanism having a steering mechanism.

DESCRIPTION OF PREFERRED EMBODIMENT

Referring now to the drawing, a variable-ratio power transmission mechanism 10 takes its input drive by way of a pair of bevel gears 11, 12 and a pair of cylindrical gears 13, 14 from a conventional hydrodynamic torque converter 15 having an input shaft 9, and has two output shafts 16, 17 adapted to be connected to respective propulsion means disposed at opposite sides of a vehicle. The torque converter 15 can be locked up by engaging an associated multi-plate friction clutch 18, and includes a freewheel (one-way) clutch 19, in known manner. The final drives to the output shafts 16, 17 comprise respective epicyclic gears indicated generally at 20 and 21. The variable-ratio input member of the epicyclic gear 20 is an annular gear 22, the output member thereof is a planet carrier 23, and the set of planet pinions 24 journalled in said carrier mesh with both the annular gear 22 and a sun gear 25. Similarly, the variable-ratio input member of the epicyclic gear 21 is an annular gear 26, the output member thereof is a planet carrier 27, and the set of planet pinions 28 journalled in said carrier mesh with both the annular gear 26 and a sun gear 29. The sun gears 25, 29 form part of a steering mechanism which will now be described.

A null shaft 30 is driveably connected to a gear 31 co-axially fixed to the sun gear 25 by way of a gear 32 and one idler gear 33, and to a gear 34 co-axially fixed to the sun gear 29 by way of a gear 35 and two idler gears 36, 37, so as to apply equal and opposite reaction forces to the sun gears 25, 29 in known manner. The vehicle can therefore move straight ahead when there is no rotation of the sun gears 25, 29 and the null shaft 30 provided that the drive resistance is the same at each propulsion means.

A mechanical two-speed drive is provided for rotating the null shaft 30 in either direction so as to effect steering of the vehicle by varying the relative rotational speeds of the output shafts 16, 17. Said drive is taken from the gear 13, that is to say from the input side of the power transmission mechanism 10, by way of an idler pinion 38 meshing with a gear wheel 39 fixed to a first shaft 40. The first shaft 40 is driveably connected to a second shaft 41 which is co-axial therewith by means of a lockable epicyclic reduction gear having a ratio of, say, 3:1 and indicated generally at 42.

The epicyclic reduction gear 42 comprises a sun gear 43 fixed to the first shaft 40, a set of planet pinions 44 meshing with the sun gear 43 and journalled in a planet carrier 45 fixed to the second shaft 41, and an annular gear 46 meshing with the set of planet pinions 44. A multi-plate friction clutch 47 for driveably interconnecting the first shaft 40 and the annular gear 46 is engaged hydraulically and disengaged by spring means. A freewheel (oneway) clutch 48 is associated with the annular gear 46, and is so disposed as to hold the gear 46 against rotation when the friction clutch 47 is disengaged and to overrun when said clutch is engaged.

The second shaft 41 is capable of driving a third shaft 49 parallel thereto by way of two alternative power paths. One of said paths includes a gear 50 fixed to the second shaft 41 and meshing with a gear 51 fixed to a first sleeve 52 co-axially surrounding one zone of the third shaft 49, and the other of said paths includes a gear 53 fixed to the second shaft 41 and meshing with an idler pinion 54 which in turn meshes with a gear 55 fixed to a second sleeve 56 co-axially surrounding another zone of the third shaft 49. The sleeves 52, 56 are alternatively driveably connectible to the third shaft 49 by respective multi-plate friction clutches 57, 58 each of which is engaged hydraulically and disengaged by spring means.

A pinion 59 rigidly secured on the third shaft 49 meshes with a gear wheel 60 which is co-axial with the null shaft 30 and driveably connected thereto by way of a gear-type coupling 61.

In operation, when it is desired to steer the vehicle to one side, oil under pressure is first supplied to the appropriate one, say 57, of the friction clutches associated with the third shaft 49. The clutch 57 then engages progressively so as to cause the null shaft 30 to rotate in one direction at an increasing rate, resulting in an increasing steering action due to an increasing variation in the relative rotational speeds of the sun gears 25, 29 of the final drive epicyclic gears 20, 21, until said shaft attains a first speed. During this first phase of steering, the second shaft 41 is driven by the epicyclic reduction gear 42 at a lower speed than the first shaft 40 but at a predetermined oil pressure approximating to that required to fully engage the clutch 57, oil is supplied to the friction clutch 47 associated with the epicyclic reduction gear 42 to initiate a second phase of steering. The clutch 47 then locks up the epicyclic reduction gear 42 so as to drive the second shaft 41 at the same speed as the first shaft 40 and thus to rotate the null shaft 30 in said one direction at a higher speed. This reduces the turning circle to a minimum for whatever gear ratio is being transmitted by the power transmission mechanism 10. The vehicle can of course be steered to the other side by initially engaging the other friction clutch 58 associated with the third shaft 49, so that the null shaft 30 rotates in the opposite direction, and subsequently engaging the friction clutch 47. When the vehicle is required to move straight ahead, the friction clutches 47, 57 and 58 are in the disengaged condition, and although the first and second shafts 40, 41 are rotated at different speeds and the first and second sleeves 52, 56 also rotate, there is no rotation of the third shaft 49 nor, as previously stated, of the null shaft 30.

The advantages of the mechanical two-speed drive are as follows:

(a) When the vehicle is moving straight ahead, the action of the unlocked epicyclic reduction gear 42 keeps the relative speeds of the plates of the disengaged friction clutches 57, 58 to a minimum, so that the heat generated within said clutches is correspondingly low.

(b) The progessive engagement of the friction clutches 57, 58 gives a variable turning circle approximating to the characteristics of a wheeled vehicle with conventional steering-wheel controlled steering means separate from its power transmission mechanism.

We claim:

1. In a power transmission mechanism of the type having two output shafts adapted to be drive connected to respective propulsion means disposed at opposite sides of a vehicle, a steering mechanism for simultaneously causing the rotational speed of either one of said shafts to increase and that of the other of said shafts to decrease comprising a null shaft driveable in either direction of rotation to effect steering by varying the relative rotational speeds of the output shafts as aforesaid, and a variable mechanical two-speed drive taken from the input side of the power transmission mechanism operable for rotating the null shaft at a first speed, and then at a higher speed, in either direction.

2. In the mechanism defined in claim 1, said variable mechanical two-speed drive comprising a two speed gear assembly connected for selective rotation of said null shaft in either direction by means including two separate clutches, and means for actuating said two speed gear assembly to increase the speed initially imparted through a selected one of said clutches to said null shaft.

3. In the mechanism defined in claim 1, said output shafts being driven through respective epicyclic gears that are also connected to be driven by said null shaft, and said variable mechanical two-speed drive having an input driven from the input to said power transmission mechanism and an output connected to said null shaft and said variable mechanical two speed drive containing means for varying the speed imparted to said null shaft by the two speed drive.

4. In the mechanism defined in claim 3, the input to said two-speed drive containing an input shaft that is driven from the power transmission input at a predetermined speed and the output from said two-speed drive comprising an output shaft having selectively alternate drive paths to a further shaft geared to said null shaft, variable gear means intermediate the input and output shafts of said two-speed drive for initially driving said output shaft of the two-speed drive at a speed less than said input shaft, means effective upon said variable gear means when said null shaft attains said first speed for driving said output shaft of the two-speed drive at the speed of said input shaft of the two-speed drive, and means for changing the direction of rotation imparted to said null shaft comprising selectively actuatable clutch means in said alternate paths.

5. In a power transmission mechanism of the type having two output shafts adapted to be connected to respective propulsion means disposed at opposite sides of a vehicle, a steering mechanism for simultaneously causing the rotational speed or either one of said shafts to increase and that of the other of said shafts to decrease comprising a null shaft driveable in either direction of rotation to effect steering by varying the relative rotational speeds of the output shafts as aforesaid, and a mechanical two-speed drive taken from the input side of the power transmission mechanism for rotating the null shaft at a first speed, and then at a higher speed, in either direction, said mechanical two-speed drive comprising a constantly driven first shaft, a lockable epicyclic reduction gear driveably connecting the first shaft to a second shaft co-axial therewith, two gear trains having odd and even numbers of gears respectively and alternatively capable of driving a third shaft from the second shaft by way of respective friction clutches, and a permanent driving connection between the third shaft and the null shaft.

6. A steering mechanism according to claim 5, wherein the lockable epicyclic reduction gear comprises a sun gear fixed to the first shaft, a set of planet pinions meshing with the sun gear and journalled in a planet carrier fixed to the second shaft, an annular gear meshing with the set of planet pinions, a friction clutch for driveably interconnecting the first shaft and the annular gear, and a freewheel clutch so disposed as to hold the annular gear against rotation when the friction clutch is disengaged and to overrun when the friction clutch is engaged.

7. A steering mechanism according to claim 5, wherein the permanent driving connection between the third shaft and the null shaft includes a gear-type coupling.

8. A steering mechanism according to claim 6, wherein the permanent driving connection between the third shaft and the null shaft includes a gear-type coupling.

* * * * *